Earl C. Newton's improvement in Carriage Shaft and Pole Couplings.
71404
PATENTED
NOV 26 1867
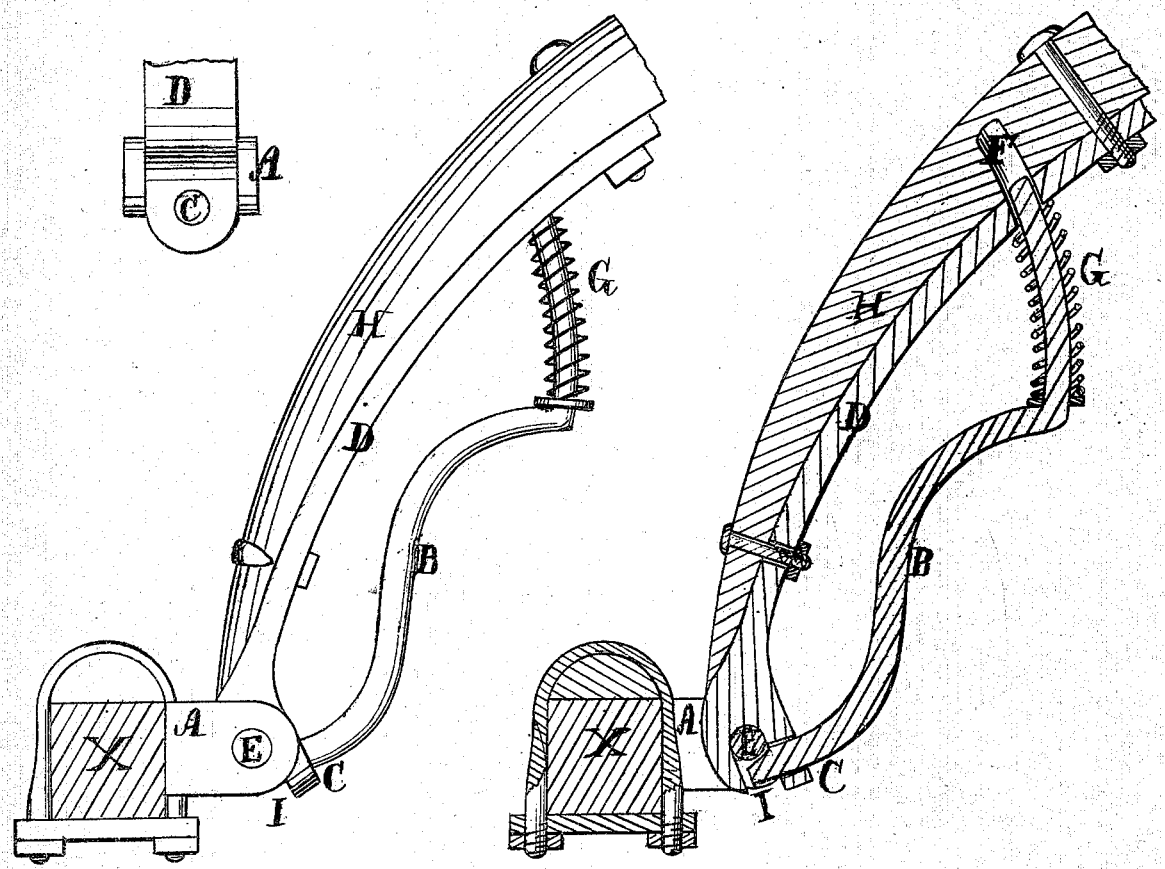
Witnesses
Henry C. Paddock
D. B. Town
Inventor
Earl C. Newton

United States Patent Office.

EARL C. NEWTON, OF BATAVIA, ILLINOIS.

Letters Patent No. 71,404, dated November 26, 1867.

---

IMPROVEMENT IN CARRIAGE-SHAFT AND POLE-COUPLING.

---

*The Schedule referred to in these Letters Patent and making part of the same.*

---

TO ALL WHOM IT MAY CONCERN:

Be it known that I, EARL C. NEWTON, of Batavia, in the county of Kane, and State of Illinois, have invented a new and useful Improvement in Carriage-Shafts and Pole-Couplings; and I do hereby declare that the following is a full, clear, and exact description thereof, which will enable others skilled in the art to make and use the same, reference being had to the accompanying drawings, forming part of this specification.

This improvement relates to the manner in which the shafts or pole are attached to the axle of a carriage, and for the convenience of removing the shafts or pole from the carriage without the trouble of removing nuts, bolts, screws, or pins.

The invention consists in, X, the carriage-axle; A, the draw-clip; E, the draw-pin which is riveted into the clip A; D, the shaft-iron which is bolted to the shaft H; I, the slotted hole in the shaft-iron D, for the purpose of sliding on to the pin E; C, the hole in the shaft-iron D to admit the slide-iron or lever B. B, the slide-iron or lever, forced through the hole C by the spring G to prevent the shaft-iron D from raising off from the pin E. The slide-iron or lever B, being in a wedge-shape where it bears on the pin E, prevents all rattling, and, as it wears, is forced in by the spring G and held tight. F, the hole in the shaft to admit the slide-iron or lever B, and to prevent the slide-iron or lever B from moving so far as to let it draw out of the hole C.

Claim.

What I claim as my invention, and desire to secure by Letters Patent, is—

1. The application of the lever B to the shaft-iron D, through the holes C and F, as herein described.
2. The application of the spring G to the slide-iron or lever B, in the manner and for the purpose set forth.

EARL C. NEWTON.

Witnesses:
HENRY C. PADDOCK,
WM. COFFIN.